I. Merrill,
Stone-Channeling Machine.
No. 2,129. Reissued Dec. 19, 1865.
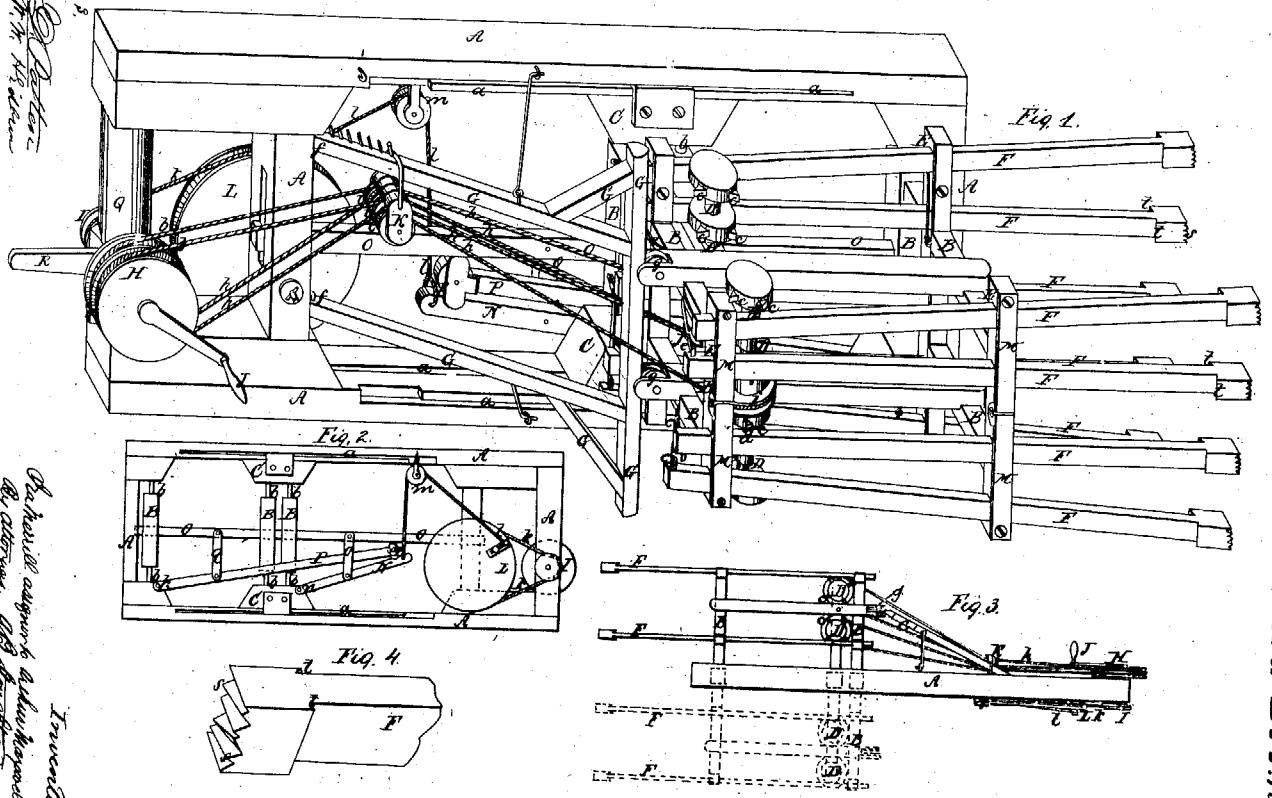
Witnesses,
Jno. D. Patton
W. M. Hilden
Inventor,
Ira Merrill assignor to Arthur Maxwell,
By attorney, A. B. Stoughton

UNITED STATES PATENT OFFICE.

ARTHUR MAXWELL, OF SHELBURNE FALLS, MASSACHUSETTS, ASSIGNEE OF IRA MERRILL.

IMPROVED MACHINE FOR TUNNELING AND QUARRYING.

Specification forming part of Letters Patent No. 14,755, dated April 22, 1856; Reissue No. 2,129, dated December 19, 1865.

*To all whom it may concern:*

Be it known that IRA MERRILL, of Shelburne Falls, in the county of Franklin and State of Massachusetts, did invent certain new and useful Improvements in Machines for Tunneling and Quarrying Rock; and I do hereby declare that the following is a full, clear, and exact description of the same, reference being had to the accompanying drawings, making a part of this specification, in which—

Figure 1 represents an isometrical view of a machine constructed for the purpose, and showing the invention embraced therein. Fig. 2 represents on a diminished scale a view of the opposite side of the machine from that shown in Fig. 1, it being an elevation of that side. Fig. 3 represents a top plan, and Fig. 4 represents a view of the cutting end of a chisel which has been found to work well in practice.

Similar letters of reference, where they occur in the separate figures, denote like parts of the machine in all the drawings.

Previous to the invention of IRA MERRILL attempts had been made to cut channels in rock by a series of scraping or planing tools, worked back and forth on the rock after the manner of cutting grooves in wood or metal; but these attempts ended in failures, and never went into use. Machines for drilling a series of round holes into which "feathers and wedges" were driven for splitting the rock in the line or the holes were the only ones used to any extent, and these did their work indifferently.

IRA MERRILL was the first person to conceive and carry into practical operation the plan of cutting channels in rock by tools that were forced against the rock in the line of the channels to be cut by blows or their equivalents, using for such sudden force the reaction of compressed springs as the most economical and practical; but the quick and sudden projection of the tool or tools was the important element to perfect success. Drills had been previously thus driven against rock, and had, in addition to their reciprocating motions to and from the rock, an intermittingly rotating motion around their axis, so as to cut a round hole in the usual well-known way, the drills having but a single cutting-edge, and cutting by diametrical lines. IRA MERRILL imparted to his channeling-tools two combined motions, but not such as are given to drills. Besides, he used tools having several cutting-edges, which could not be used in drilling round holes. The channeling-tools used by the said MERRILL had a reciprocating motion to and from the rock, and, in addition to this motion, he gave his chisels or channeling-tools a lateral motion in the line of the channel to be cut. He was therefore the first person to cut channels in rock by tools having a combined reciprocating and lateral motion.

The nature of this invention consists, first, in cutting or forming channels in rock by the use of chisels or cutting-tools that have two combined movements—viz., a reciprocating motion to and from the rock and a lateral motion in the line of the channel to be cut.

The invention further consists in a stone-cutting channeling-machine which is constructed to move up to the rock, and provided with reciprocating cutters, which are supported in standards arranged on the outside of the frame and outside of the track on said main frame.

The invention further consists in the combination of two or more cutters in gangs, connected together by means of head and foot clamps, which are adapted to slide freely between standard-guides, that are supported on one side of the frame of the machine.

The invention further consists in providing for the reversing of the cutters, so as to cut two or more sets of channels without moving the machine.

The invention further consists in giving or providing for the giving of a forward or backward movement to that part of the machine that does the cutting, or for confining it positively in position upon its track, as may be necessary during the channeling operation.

The invention further consists in securing the cutters in gangs by clamps or clasps, which hold them in proper working position, and allow them to be removed at pleasure for repairing or redressing.

The invention further consists in mechanism for giving the chisels or cutters their lateral motion in the line of the channels to be cut.

The invention further consists in the employment, in stone-channeling machines, of cutting-tools that have a series of edges parallel or oblique to the line of cut, and a reversed lip or lips for dressing or smoothing off the edges or sides of the channels.

To enable others skilled in the art to make and use the invention, I will proceed to describe the same with reference to the drawings.

For the purpose of making the machine capable of easy transportation and readily put in position, and require but little room in a quarry, the main frame A is made quite narrow, and the auxiliary frame B, that supports and carries the chisels, though supported by the main frame, projects to one side of it, so as to afford free action to said chisels, as they are operated by mechanism on the main frame.

Upon the main frame A there are ways or guides, or both, *a*, upon which the head-blocks C, that support and carry the auxiliary frame B, can move so as to change or adapt the chisels to the work to be done. The auxiliary or secondary frame is connected to the main frame by rods *b*, upon which it can move to give the chisels their lateral motion in the line of the channel to be cut.

On the secondary frame B are arranged tappet-shafts D, furnished with tappets *c*, and in this frame, in suitable guides, E, are placed the chisels F, working in gangs. Projections *d* are made on the chisel-bars or stocks, against which the tappets *c* take and move back the chisels against the action of springs *e*, and when the tappets leave the projections the chisels are thrown with a great degree of force against the rock, by which means it is cut or abraded.

A frame, G, hinged to the main frame A at *f*, projects toward the secondary frame B, and has upon it a guide, against which the friction-rolls *g g* in the secondary frame B run as said secondary frame is moved in the direction in which the channel is to be cut.

On the main frame there is arranged a shaft, carrying the pulleys H I, said shaft being turned by a crank, J, or in any other well-known way. From the pulley H, or the grooves therein, pass two endless belts or bands, *h*, that pass over sheaves *i* in a block, K, suspended and made adjustable on the hinged frame G. From the sheaves *i* the belts or bands pass around the drums or pulleys *j* on the tappet-shafts D, to give said shafts and their tappets their rotation, and to drive the chisels F, which are held to the secondary frame by a head and foot clamp, E, and kept in place or made removable when necessary by keepers M on the frame B. From the pulley I an endless belt, *k*, passes around a wheel or pulley, L, to which one end of a cord or chain, *l*, is fastened, and may be adjusted, said cord or chain passing over a pulley, *m*, and thence to the lever N, where it is fastened. The lever N is pivoted at *n* to the head-block C, and is, moreover, connected by a link, *o*, to a lifting-bar, O, made fast to the secondary frame B. Another lever, P, pivoted at *p*, is connected to the lifting-bar O by a link, *q*, and the free ends of the levers N and P may work against each other, as shown at *r*. As the wheel L revolves, it raises and lowers the free end of the lever N, which in turn raises and lowers the free end of the lever P, and also through the link-connection *o* raises and lowers the bar O, connected to the secondary frame, and consequently raises and lowers said frame. The lever P, being also connected to the bar O through the link *q*, at another and remote point from the link *o*, the two levers N and P thus lift the secondary frame and the chisels and let them down again; or, in other words, traverse said secondary frame and chisels in the line in which the channels are to be cut, with a uniform and steady motion, while the chisels, as heretofore described, have also a reciprocating motion to and from the rock by the system of tappet-wheels and reacting-springs. As the channels are cut deeper and deeper, the machine is moved up by jacks or any other feeding mechanism ordinarily used for such purpose.

The machine is made capable of being reversed on the main frame without reversing the latter, and as shown by dotted lines in Fig. 3, and by this arrangement a second set of channels may be cut parallel with the first without moving the main frame; and while I have shown the machine as arranged for cutting vertical channels, it is obvious that the chisels may be arranged for cutting horizontal channels, and thus blocking out the rock in squares or parallelograms for laying up walls with but very little hammer-dressing.

In Fig. 4 I have represented on an enlarged scale one of the chisels which has been used with success. In this chisel there are a series of cutting or abrading edges, *s s*, formed on oblique or irregular lines in relation to each other, to prevent the formation of "leading or dodging points or spaces," as the oblique edges will overcut each other, while parallel and straight edges might follow in such leading points or spaces; but, as shown in Fig. 1, these edges may be straight and parallel to each other and still do good work. In addition to the cutting-edges *s* on the chisels, one or two reversed edges, *t*, are made thereon, which, as the chisels are drawn back previous to their being suddenly forced against the rock again, will cut or smooth off any projecting portions that might otherwise impede their free action.

The secondary frame, that carries the chisels, projects from and is at one side of the main frame, and though the chisels are operated by mechanism on the main frame, yet they work at one side thereof, and are more easily advanced to the work and more readily removed, turned, or replaced than if they were on or worked over space occupied by said main frame.

The post Q, that carries the driving-gear, can be, by means of the lever R, turned around in the main frame, so as to reverse the gear when the chisels are moved to the opposite side of the machine, and thus bring the parts in proper working position in relation to each other. When the gearing is thus swung around, the chisels and their supporting parts removed, the frame G will swing through the opening in the main frame. The chisels and other detached parts are then put in place, and the machine is ready to cut another series of channels, as shown by the dotted lines in Fig. 3, the driving-gear not being represented as turned around, though it can be so turned.

Having thus fully described the nature, object, and purpose of the invention of the said IRA MERRILL, what is claimed therein as new, and desired to be secured by Letters Patent, is—

1. The cutting or forming of channels in rock by the use of chisels or cutting-tools that have two combined movements—viz., a reciprocating movement to and from the rock and a lateral movement in the line of the channel or channels to be cut—substantially as herein described.

2. A stone-cutting channeling-machine which is constructed to be moved up to the rock, and provided with reciprocating cutters which are supported in standards arranged on the outside of the frame, substantially as described.

3. The combination of two or more cutters in gangs connected together by means of head and foot clamps which are adapted to slide freely between standard-guides that are supported on one side of the frame of the machine, substantially as described.

4. Making the chisels reversible on the frame, so as to cut two or more sets of channels without moving the machine, substantially as described.

5. In combination with the backward and forward movement of the cutters, the advancing movement of the main frame to feed the chisels up to their work, substantially as described.

6. Securing the chisels together in gangs by clasps or clamps, which hold them in proper working position and allow them to be removed at pleasure for repairing or re-dressing, substantially as described.

7. The mechanism for giving the chisels or cutters their lateral motion in the line of the channels to be cut, it being composed substantially of the levers, links, and lifting-bar operated through a flexible cord or chain, substantially as described.

8. The use or employment in stone-channeling machines of chisels or cutting-tools, that have a series of straight, parallel, or oblique edges, in combination with one or more reversed cutting-edges to remove any roughness from the sides of the channels, substantially as described.

ARTHUR MAXWELL.

Witnesses:
S. D. BARDWELL,
O. P. PAYNE,
GEO. H. ROBBINS.